US012244405B2

(12) United States Patent
Yamamoto

(10) Patent No.: US 12,244,405 B2
(45) Date of Patent: Mar. 4, 2025

(54) RECEPTION DEVICE

(71) Applicant: Panasonic Intellectual Property Management Co., Ltd., Osaka (JP)

(72) Inventor: Masataka Yamamoto, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 114 days.

(21) Appl. No.: 18/164,388

(22) Filed: Feb. 3, 2023

(65) Prior Publication Data

US 2023/0269014 A1 Aug. 24, 2023

(30) Foreign Application Priority Data

Feb. 21, 2022 (JP) ................................ 2022-025098

(51) Int. Cl.

*H04H 40/45* (2008.01)
*H04H 20/33* (2008.01)
*H04H 20/71* (2008.01)
*H04H 20/86* (2008.01)

(52) U.S. Cl.

CPC ............ *H04H 40/45* (2013.01); *H04H 20/33* (2013.01); *H04H 20/71* (2013.01); *H04H 20/86* (2013.01)

(58) Field of Classification Search

None

See application file for complete search history.

(56) References Cited

U.S. PATENT DOCUMENTS

2012/0316663 A1 12/2012 Sasanabe et al.
2020/0145040 A1 * 5/2020 Asaka .................... H04H 20/26
2021/0058176 A1 2/2021 Yamamoto

FOREIGN PATENT DOCUMENTS

JP 2021034796 A 3/2021
WO WO 2011102144 A1 8/2011

* cited by examiner

*Primary Examiner* — Kenny H Truong

(74) *Attorney, Agent, or Firm* — Seed IP Law Group LLP

(57) ABSTRACT

A reception device includes a first electronic component and a second electronic component. The first electronic component includes a first signal processor and a first control circuit controlling the first signal processor. The second electronic component includes a second signal processor and a second control circuit controlling the second signal processor. The first control circuit controls the first signal processor such that transmission of a reception signal from a first transmitter of the first signal processor to the second electronic component and transmission of an analog sound signal from a second transmitter of the first signal processor to the second electronic component are simultaneously started.

12 Claims, 5 Drawing Sheets

1

1B

RECEPTION DEVICE

CROSS-REFERENCE TO RELATED APPLICATIONS

This application is based upon and claims the benefit of priority from Japanese Patent Application No. 2022-025098, filed on Feb. 21, 2022, the entire contents of which are incorporated herein by reference.

FIELD

The present disclosure relates generally to a reception device.

BACKGROUND

Terrestrial radio broadcasting in North America is referred to as HD radio. In the HD radio, the in-band on-channel (IBOC) standard is adopted. In the IBOC standard, an analog broadcast wave subjected to amplitude modulation (AM) modulation or frequency modulation (FM) modulation and a digital broadcast wave subjected to orthogonal frequency division multiplexing (OFDM) modulation are transmitted.

In the IBOC standard, for example, a digital broadcast wave is transmitted using frequency bands on both upper and lower sides of an analog broadcast wave. A reception device simultaneously receives an analog broadcast wave and a digital broadcast wave by receiving a radio wave in a specific frequency band. In addition, the analog broadcast wave and the digital broadcast wave transmitted in the same frequency band include the same sound components. The reception device adjusts an output time difference such that timings of the same sound components coincide between the analog broadcast wave and the digital broadcast wave, and switches and outputs a digital sound signal of the digital broadcast wave and an analog sound signal of the analog broadcast wave (for example, WO 2011/102144 A).

Meanwhile, there is a known configuration that a reception device side includes a plurality of electronic components, and demodulation of a digital broadcast wave and demodulation of an analog broadcast wave are performed by different electronic components. In such a configuration, it is difficult to keep constant the difference in processing time between the digital broadcasting processing system and the analog broadcasting processing system. For this reason, in the conventional technique, it may be difficult to adjust the output time difference between a digital sound signal and an analog sound signal such that timings of the same sound components included coincide with each other.

SUMMARY

A reception device according to the present disclosure includes a first electronic component and a second electronic component. The first electronic component includes a first memory in which a first computer program is stored, a first processor coupled to the first memory, and a first control circuit controlling the first processor. The second electronic component includes a second memory in which a second computer program is stored, a second processor coupled to the second memory, and a second control circuit controlling the second processor. The first processor is configured to perform processing by executing the first computer program. The processing includes: outputting an analog sound signal generated by demodulating a reception signal, the reception signal including a digital broadcast wave and an analog broadcast wave; transmitting the reception signal to the second electronic component; and transmitting the analog sound signal to the second electronic component. The second processor is configured to perform processing by executing the second computer program. The processing includes: receiving the reception signal from the first electronic component; receiving the analog sound signal from the first electronic component; outputting a digital sound signal generated by demodulating the reception signal; and selecting, as an output sound signal, at least one of the digital sound signal and the analog sound signal. The first control circuit is configured to control the first processor to simultaneously start the transmission of the reception signal from the first electronic component to the second electronic component and the transmission of the analog sound signal from the first electronic component to the second electronic component.

DETAILED DESCRIPTION

Hereinafter, an embodiment of a reception device 1 according to the present disclosure will be described with reference to the drawings.

First Embodiment

Figure 1:
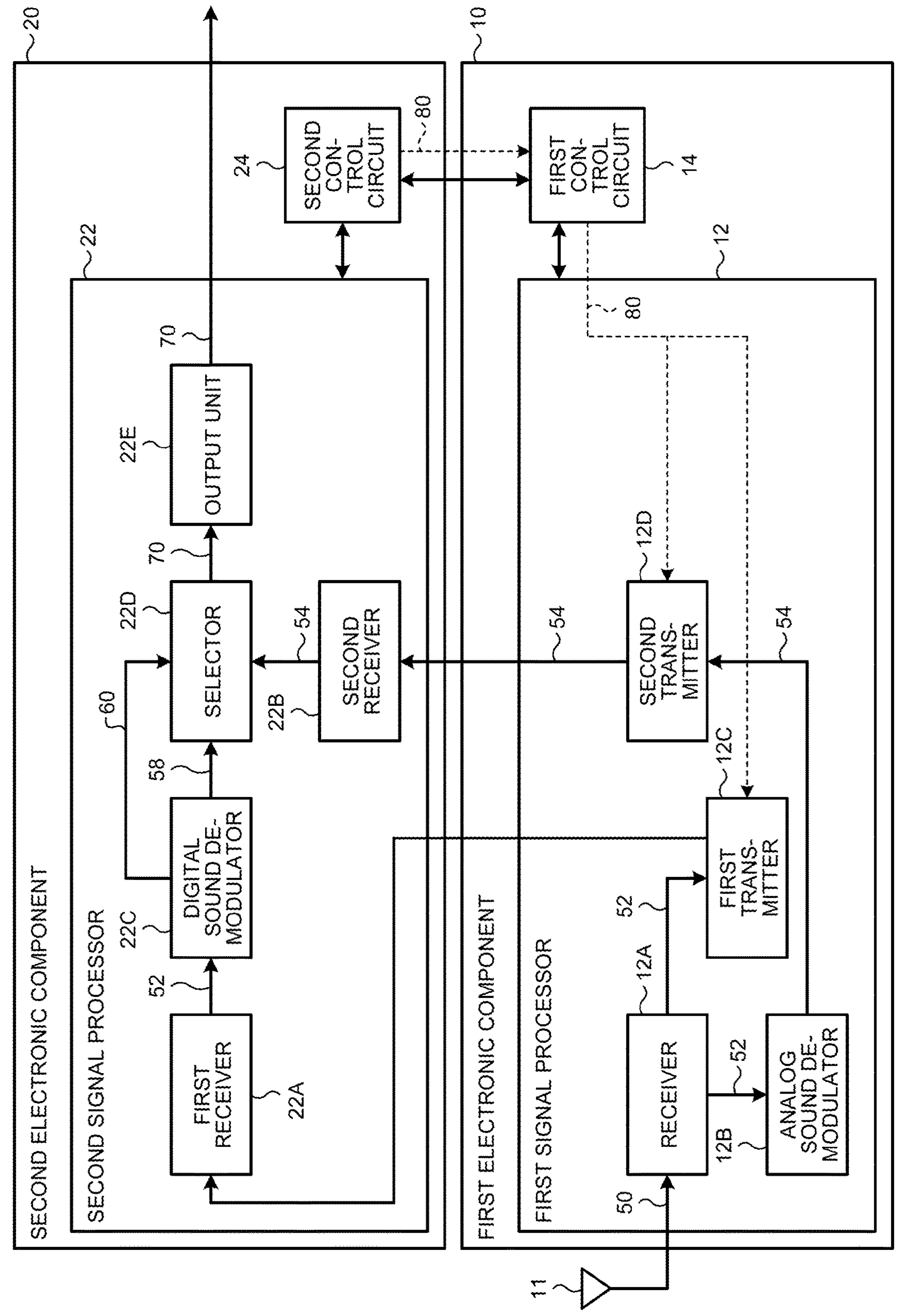
FIG. 1 is a diagram illustrating a configuration of a reception device according to a first embodiment.

FIG. 1 is a diagram illustrating a configuration of the reception device 1 according to a present embodiment. The reception device 1 receives and demodulates a radio broadcast wave 50, and outputs an output sound signal 70.

The radio broadcast wave 50 includes an analog broadcast wave and a digital broadcast wave.

The analog broadcast wave is an AM-modulated or FM-modulated broadcast wave. The digital broadcast wave is an OFDM-modulated broadcast wave. The analog broadcast wave and the digital broadcast wave include the same sound components and are simultaneously broadcast. That is, the analog broadcast wave and the digital broadcast wave are simultaneously broadcast.

In the present embodiment, a case where the analog broadcast wave and the digital broadcast wave are broadcast waves of the IBOC standard will be described as an example. Therefore, in the present embodiment, the digital broadcast wave is transmitted by using the frequency bands on the upper and lower sides of the analog broadcast wave. Note that the analog broadcast wave and the digital broadcast wave are not limited to the broadcast waves of the IBOC standard. Moreover, the analog broadcast wave and the digital broadcast wave may be modulated so as to be located in different frequency bands.

The reception device 1 includes a first electronic component 10 and a second electronic component 20. The first electronic component 10 and the second electronic component 20 are connected so as to be able to exchange data or signals.

The first electronic component 10 is an electronic component that demodulates an analog broadcast wave. The first electronic component 10 is an electronic component at least a part thereof is configured by a circuit. Note that the entire first electronic component 10 may be configured by software. At least a part of the first electronic component 10 is, for example, a semiconductor device such as a semiconductor integrated circuit.

The second electronic component 20 is an electronic component that demodulates a digital broadcast wave. The second electronic component 20 is an electronic component at least a part thereof is configured by a circuit. The entire second electronic component 20 may be configured by software. At least a part of the second electronic component 20 is, for example, a semiconductor device such as a semiconductor integrated circuit.

The second electronic component 20 and the first electronic component 10 may be the same electronic components or different electronic components. It is preferable that the second electronic component 20 and the first electronic component 10 are different from each other in at least a part of a configuration or a circuit configuration of a function unit for executing processing other than processing related to demodulation. Demodulation includes demodulation of an analog broadcast wave and demodulation of a digital broadcast wave.

First, the first electronic component 10 will be described.

The first electronic component 10 includes a first signal processor 12 and a first control circuit 14. The first signal processor 12 and the first control circuit 14 are connected so as to be able to exchange data or signals.

The first signal processor 12 executes various kinds of processing related to demodulation of the analog broadcast wave. The first control circuit 14 controls the first signal processor 12.

The first signal processor 12 includes an antenna 11, a receiver 12A, an analog sound demodulator 12B, a first transmitter 12C, and a second transmitter 12D.

At least one of the receiver 12A, the analog sound demodulator 12B, the first transmitter 12C, the second transmitter 12D, and the first control circuit 14 may be implemented by causing a processor such as a central processing unit (CPU) to execute a program, that is, may be implemented by software or may be implemented by hardware. The receiver 12A, the analog sound demodulator 12B, the first transmitter 12C, the second transmitter 12D, and the first control circuit 14 may all be implemented by software, or may all be implemented by different hardware. Alternatively, at least one of the receiver 12A, the analog sound demodulator 12B, the first transmitter 12C, the second transmitter 12D, and the first control circuit 14 may be implemented by software, and others may be implemented by hardware. In other words, the first signal processor 12 may be implemented by causing a processor such as a CPU to execute a program, that is, may be implemented by software, or may be implemented by hardware. The program is stored in, for example, a memory. The first electronic component 10 includes, for example, a first processor and a first memory. The first memory is, for example, a memory such as a read only memory (ROM) or a random access memory (RAM). For example, the first processor executes various kinds of processing related to demodulation of the analog broadcast wave by executing a first program stored in the first memory.

The antenna 11 receives the radio broadcast wave 50. As described above, the radio broadcast wave 50 includes a digital broadcast wave and an analog broadcast wave.

The receiver 12A converts the radio broadcast wave 50 received by the antenna 11 into a reception signal 52 that is a base band IQ (BBIQ) signal, and then outputs the reception signal 52 to the analog sound demodulator 12B and the first transmitter 12C. The receiver 12A modulates the radio broadcast wave 50 such that the center frequency of the frequency band of the analog broadcast wave included in the radio broadcast wave 50 becomes 0 Hz, and such that a signal becomes a signal of the frequency band of $\pm\alpha$ Hz from 0 Hz, thereby obtaining the reception signal 52. A value for a may be a frequency that is half of the total value of the frequency band of the analog broadcast wave and the frequency band of the digital broadcast wave occupying both the upper and lower frequency bands of the analog broadcast wave. For example, $\alpha$ is 200 Hz, but is not limited to this value.

The analog sound demodulator 12B outputs an analog sound signal 54 generated by demodulating the reception signal 52. The analog sound signal 54 is digital data representing sound obtained by demodulating a signal of the analog broadcast wave included in the reception signal 52. The analog sound signal 54 may be an analog audio signal. For example, the analog sound demodulator 12B outputs the analog sound signal 54 obtained by performing AM demodulation or FM demodulation on a signal of the analog broadcast wave included in the reception signal 52. The analog sound demodulator 12B outputs the analog sound signal 54 to the second transmitter 12D.

The first transmitter 12C transmits the reception signal 52 input from the receiver 12A to the second electronic component 20.

The first transmitter 12C is an interface that transmits data. The first transmitter 12C transmits the reception signal 52 to the second electronic component 20 according to, for example, an Inter-IC Sound (I2S) scheme. Note that the communication scheme of the first transmitter 12C is not limited to I2S. For example, the first transmitter 12C may operate in accordance with the secure digital input/output (SDIO) standard and transmit the reception signal 52 to the second electronic component 20.

The second transmitter 12D transmits the analog sound signal 54 input from the analog sound demodulator 12B to the second electronic component 20.

The second transmitter 12D is an interface that transmits data. The second transmitter 12D transmits the analog sound signal 54 to the second electronic component 20 according to, for example, the I2S scheme. Note that the communication scheme of the second transmitter 12D is not limited to I2S.

The first control circuit 14 controls the first signal processor 12. The first control circuit 14 controls the first signal processor 12 such that transmission of the reception signal 52 from the first transmitter 12C to the second electronic component 20 and transmission of the analog sound signal 54 from the second transmitter 12D to the second electronic component 20 are simultaneously started.

The simultaneous start means that a time lag between start timings of the transmission of the reception signal 52 and the transmission of the analog sound signal 54 to the second electronic component 20 is equal to or less than a first time difference.

The first time difference refers to a time difference that can be determined as "simultaneous" in the reception device 1. In the present embodiment, a mode in which the first time difference is a time difference equal to or less than a second time difference will be described as an example.

The second time difference refers to a time difference equal to or less than the maximum value of a time difference that can be determined as a time difference with which "the timings of the same sound components coincide with each other" when the output time difference is adjusted such that the timings of the same sound components included in a digital sound signal 58 and the analog sound signal 54 coincide with each other in the second electronic component 20 to be described later.

Specifically, for example, it is assumed that the sampling frequency of a selector 22D included in the second electronic component 20 to be described later is 44.1 kHz. In this case, the second time difference may be 68 μs, which is a time corresponding to three sampling periods. In this case, the first time difference is a time difference of 68 μs or less, which is equal to or less than the second time difference. The first time difference may be, for example, 10 μs, 1 μs, or the like.

In the present embodiment, the first control circuit 14 transmits an output start instruction signal 80 to the first transmitter 12C and the second transmitter 12D when the reception device 1 is activated. By the transmission of the output start instruction signal 80 to the first transmitter 12C and the second transmitter 12D, the first control circuit 14 controls the first signal processor 12 such that the transmission of the reception signal 52 to the second electronic component 20 and the transmission of the analog sound signal 54 to the second electronic component 20 are simultaneously started.

The output start instruction signal 80 is a signal for instructing to start output of a signal. In other words, the output start instruction signal 80 is a signal that triggers signal output start. For example, the output start instruction signal 80 is a command for instructing to start output of a signal. Note that the output start instruction signal 80 may be a signal represented by switching between a high state where the signal level flowing between terminals is controlled to be equal to or greater than the threshold value and a low state where the signal level is controlled to be less than the threshold value.

For example, when power supply to each unit of the reception device 1 is started by an operation instruction or the like by the user, and the reception device 1 is activated, the first control circuit 14 transmits the output start instruction signal 80 to the first transmitter 12C and the second transmitter 12D.

Specifically, the first control circuit 14 transmits the output start instruction signal 80 to the first transmitter 12C and the second transmitter 12D when the reception device 1 is activated by a start of power supply and then receives the output start instruction signal 80 from the second electronic component 20.

Upon receiving the output start instruction signal 80 from the first control circuit 14, the first transmitter 12C and the second transmitter 12D start transmitting the reception signal 52 and the analog sound signal 54 to the second electronic component 20, respectively. In one example, the first transmitter 12C and the second transmitter 12D each cause the timing of a clock signal used for starting the signal output to the second electronic component 20 to coincide with the reception timing of the output start instruction signal 80. By the above processing, the first transmitter 12C and the second transmitter 12D simultaneously start transmitting the reception signal 52 and the analog sound signal 54 to the second electronic component 20. Accordingly, the transmission of the reception signal 52 from the first transmitter 12C to the second electronic component 20 and the transmission of the analog sound signal 54 from the second transmitter 12D to the second electronic component 20 are simultaneously started.

Next, the second electronic component 20 will be described.

The second electronic component 20 includes a second signal processor 22 and a second control circuit 24. The second signal processor 22 and the second control circuit 24 are connected so as to be able to exchange data or signals. The second control circuit 24 of the second electronic component 20 and the first control circuit 14 of the first electronic component 10 are communicably connected.

The second signal processor 22 performs various kinds of processing related to demodulation of the digital sound signal 58 and output of the output sound signal 70. The second control circuit 24 controls the second signal processor 22.

The second signal processor 22 includes a first receiver 22A, a second receiver 22B, a digital sound demodulator 22C, the selector 22D, and an output unit 22E. At least one of the first receiver 22A, the second receiver 22B, the digital sound demodulator 22C, the selector 22D, the output unit 22E, and the second control circuit 24 may be implemented by causing a processor such as a CPU to execute a program, that is, may be implemented by software or may be implemented by hardware. The first receiver 22A, the second receiver 22B, the digital sound demodulator 22C, the selector 22D, the output unit 22E, and the second control circuit 24 may all be implemented by software, or may all be implemented by different hardware. Alternatively, at least one of the first receiver 22A, the second receiver 22B, the digital sound demodulator 22C, the selector 22D, the output unit 22E, and the second control circuit 24 may be implemented by software, and others may be implemented by hardware. In other words, the second signal processor 22 may be implemented by causing a processor such as a CPU to execute a program, that is, may be implemented by software, or may be implemented by hardware. The program is stored in, for example, a memory. The second electronic component 20 includes, for example, a second processor and a second memory. The second memory is, for example, a memory such as a ROM or a RAM. For example, the second processor executes various kinds of processing by executing the second program stored in the second memory.

The first receiver 22A is a communication interface that communicates with the first transmitter 12C of the first electronic component 10. In other words, the first receiver 22A of the second electronic component 20 and the first transmitter 12C of the first electronic component 10 form one communication path for transmitting and receiving data in a one-to-one relationship. Therefore, the first receiver 22A operates in conformity with the same standard as the first transmitter 12C, and receives the reception signal 52 from the first transmitter 12C.

The first receiver 22A outputs the reception signal 52 received from the first transmitter 12C to the digital sound demodulator 22C.

The second receiver 22B is a communication interface that communicates with the second transmitter 12D of the first electronic component 10. In other words, the second receiver 22B of the second electronic component 20 and the second transmitter 12D of the first electronic component 10 form one communication path for transmitting and receiving data in a one-to-one relationship. Therefore, the second receiver 22B operates in conformity with the same standard as the second transmitter 12D, and receives the analog sound signal 54 from the second transmitter 12D.

The second receiver 22B outputs the analog sound signal 54 received from the second transmitter 12D to the selector 22D.

The digital sound demodulator 22C demodulates the reception signal 52 input from the first receiver 22A, and outputs the digital sound signal 58. The digital sound signal 58 is digital data representing sound obtained by demodulating a signal of the digital broadcast wave included in the reception signal 52. The digital sound signal 58 may be an audio signal. For example, the digital sound demodulator 22C outputs the digital sound signal 58 obtained by performing OFDM demodulation on a signal of the digital broadcast wave included in the reception signal 52 to the selector 22D.

The digital sound demodulator 22C generates a switching signal 60 by using the reception signal 52 input from the first receiver 22A, and outputs the switching signal 60 to the selector 22D. The switching signal 60 is a signal for switching between a state where the analog sound signal 54 is selected as the output sound signal 70 to be output and a state where the digital sound signal 58 is selected as the output sound signal 70.

For example, when demodulation is successful in generating the digital sound signal 58, the digital sound demodulator 22C generates the switching signal 60 for switching from a state where the analog sound signal 54 is selected to a state where the digital sound signal 58 is selected. In addition, when demodulation is unsuccessful in generating the digital sound signal 58, the digital sound demodulator 22C generates the switching signal 60 for switching from the state where the digital sound signal 58 is selected to the state where the analog sound signal 54 is selected.

For example, the digital sound demodulator 22C calculates a carrier to noise (C/N) ratio on the basis of the signal spectrum of a signal of the digital broadcast wave included in the reception signal 52. For example, the digital sound demodulator 22C calculates an error rate, as a C/N ratio, when Viterbi decoding is performed on data obtained by OFDM demodulation. Moreover, for example, the digital sound demodulator 22C compares the signal level and the noise level of the demodulated digital sound signal 58 to calculate a signal to noise (S/N) ratio. Then, the digital sound demodulator 22C may determine the reception state by using at least one of the C/N ratio and the S/N ratio.

The selector 22D selects at least one of the digital sound signal 58 and the analog sound signal 54 as the output sound signal 70. Then, the selected output sound signal 70 is output to the output unit 22E.

Specifically, the digital sound signal 58 and the switching signal 60 are input from the digital sound demodulator 22C to the selector 22D. Moreover, the analog sound signal 54 is input from the second receiver 22B to the selector 22D.

The selector 22D adjusts an output time difference between the digital sound signal 58 and the analog sound signal 54 such that the timings of the same sound components included in the digital sound signal 58 input from the digital sound demodulator 22C and the analog sound signal 54 input from the second receiver 22B coincide with each other.

As described above, under the control of the first control circuit 14, the transmission of the reception signal 52 from the first transmitter 12C to the second electronic component 20 and the transmission of the analog sound signal 54 from the second transmitter 12D to the second electronic component 20 are simultaneously started. Thus, a reception time difference between the reception signal 52 initially received by the second electronic component 20 from the first electronic component 10 and the analog sound signal 54 initially received by the second electronic component 20 from the first electronic component 10 is continuously maintained even after starting the initial reception of these signals. In other words, the difference between the timings of the same sound components included in the reception signal 52 and the analog sound signal 54 is the reception time difference that is fixed, that is, a fixed time difference. Therefore, the second electronic component 20 continuously receives the reception signal 52 and the analog sound signal 54 in a state where the fixed time difference is maintained even after the start of reception.

Therefore, the selector 22D executes adjustment processing of delaying either the digital sound signal 58 input from the digital sound demodulator 22C or the analog sound signal 54 input from the second receiver 22B so as to offset the fixed time difference. With this adjustment processing, the selector 22D adjusts an output time difference between the digital sound signal 58 and the analog sound signal 54 such that the timings of the same sound components included in the digital sound signal 58 input from the digital sound demodulator 22C and the analog sound signal 54 input from the second receiver 22B coincide with each other.

Accordingly, in the present embodiment, the selector 22D adjusts the output time difference between the digital sound signal 58 and the analog sound signal 54 using the fixed time difference such that the timings of the same sound components included coincide with each other.

The selector 22D may store in advance the fixed time difference described above. For example, the selector 22D stores in advance, as the reception time difference, information indicating a time lag between the start timings of the transmission of the reception signal 52 and the analog sound signal 54 to the second electronic component 20. In addition, the selector 22D may receive in advance information indicating the time lag between the start timings of the transmission from the first control circuit 14 via the second control circuit 24 and may store in advance the information as the above reception time difference. Then, the selector 22D may adjust the output time difference by using the above reception time difference stored in advance as a fixed time difference. The selector 22D may calculate the fixed time difference by comparing the waveforms of the analog sound signal 54 and the digital sound signal 58 after activation of the reception device 1. The selector 22D may calculate the fixed time difference each time the reception device 1 is activated. Alternatively, the selector 22D may calculate the fixed time difference only at an initial activation of the reception device 1 and store the fixed time difference. In this case, the stored fixed time difference can be used after the initial activation.

Note that, in some cases, a broadcast station, which transmits the radio broadcast wave 50, broadcasts an analog broadcast wave with a predetermined first delay time after broadcasting a digital broadcast wave. In this case, the reception device 1 receives, with the first delay time delay, the analog broadcast wave included in the radio broadcast wave 50 with respect to the same sound component as the sound component included in the digital sound wave. The first delay time is determined in advance on the broadcast station side that distributes the radio broadcast wave 50, on the basis of a standard or the like. For example, the first delay time is 4.458 seconds, but is not limited to this value.

In the present embodiment, the selector 22D may adjust the output time difference by using the above reception time difference and the above first delay time difference as the above fixed time difference.

Note that it is preferable that the selector 22D also performs the above-described adjustment processing on the switching signal 60. This is because the switching signal 60 is a signal generated by the digital sound demodulator 22C and thus includes the same time difference as the digital sound signal 58.

In the present embodiment, the selector 22D executes, by using the above fixed time difference, the adjustment processing of adjusting the output time difference between: the digital sound signal 58 and the switching signal 60, and the analog sound signal 54 such that the timings of the same sound components included in the digital sound signal 58 and the analog sound signal 54 coincide with each other.

Then, the selector 22D performs the switching processing using the digital sound signal 58, the switching signal 60, and the analog sound signal 54, on which adjustment of the output time difference has been performed. Specifically, by using the switching signal 60, the selector 22D switches from a state where the analog sound signal 54 is selected to a state where the digital sound signal 58 is selected, or switches from the state where the digital sound signal 58 is selected to the state where the analog sound signal 54 is selected.

The selector 22D may spend a predetermined switching time to switch from the digital sound signal 58 to the analog sound signal 54 and to switch from the analog sound signal 54 to the digital sound signal 58. The switching time is, for example, approximately one second.

The selector 22D selects at least one of the digital sound signal 58 and the analog sound signal 54, for which the output time difference has been adjusted, by the above switching processing, as the output sound signal 70, and outputs the selected output sound signal 70 to the output unit 22E.

The output unit 22E transmits the output sound signal 70 input from the selector 22D to an external device. For example, the output unit 22E transmits the output sound signal 70 to another device via a predetermined digital communication path. Moreover, for example, the output unit 22E may convert the output sound signal 70 into an analog audio signal and transmit the analog audio signal to, for example, an amplification device that drives a speaker. In addition, the output unit 22E may be provided in the first electronic component 10. In this case, the output unit 22E may transmit the output sound signal 70 to the output unit 22E of the first electronic component 10 via a communication interface (not illustrated).

Next, an example of a flow of processing executed by the reception device 1 will be described.

Figure 2:
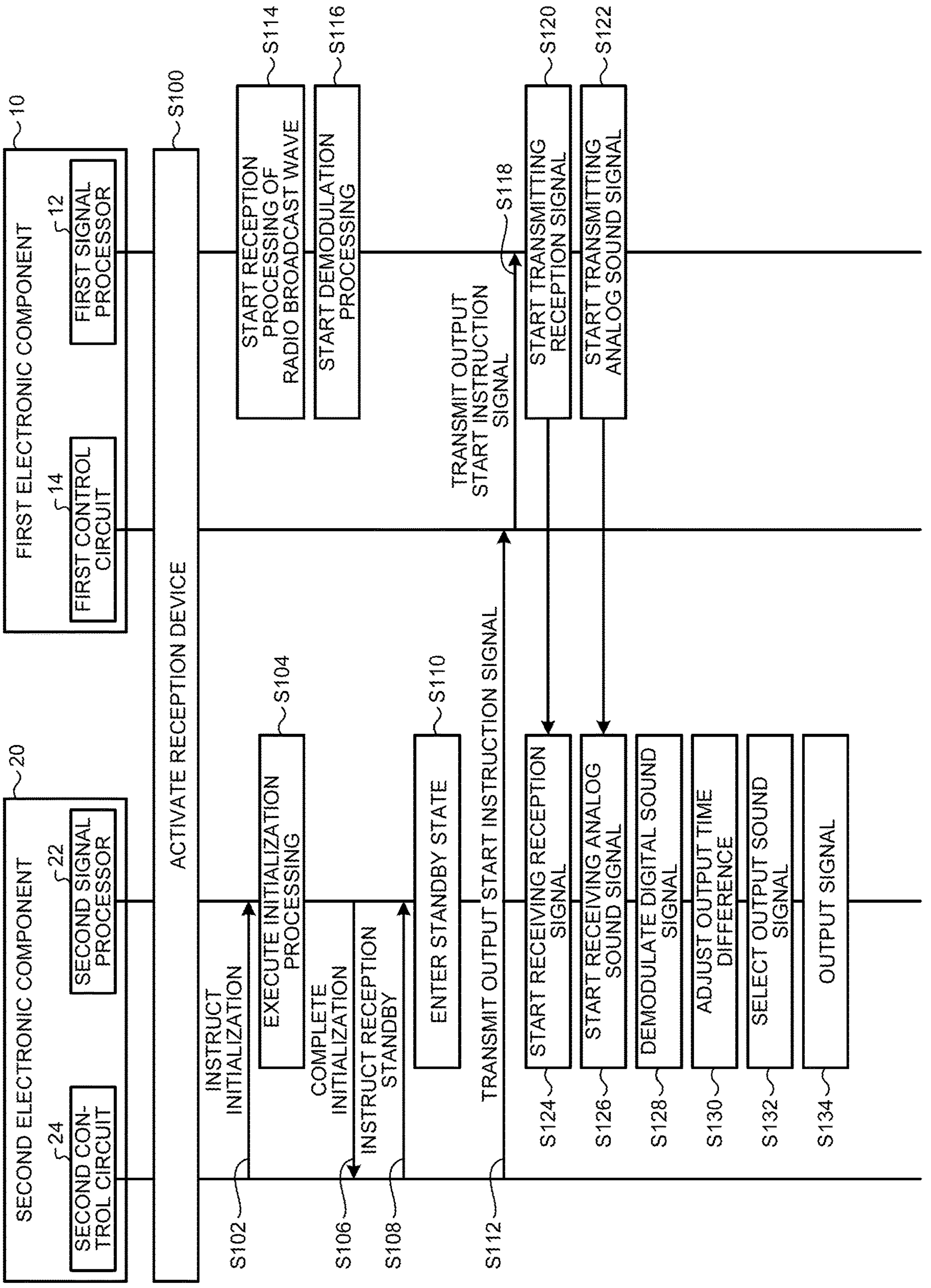
FIG. 2 is a sequence diagram illustrating a flow of processing executed by the reception device according to the first embodiment.

FIG. 2 is a sequence diagram illustrating an example of a flow of processing executed by the reception device 1.

The reception device 1 is activated (step S100). For example, the reception device 1 is activated when power supply to each unit of the reception device 1 is started.

The second control circuit 24 of the second electronic component 20 transmits a signal indicating an initialization instruction to the second signal processor 22 (step S102). The second signal processor 22 that has received the signal indicating the initialization instruction executes initialization processing (step S104). For example, the second signal processor 22 executes buffer initialization processing or the like for clearing data stored in a buffer in the second signal processor 22. When the initialization processing is completed, the second signal processor 22 transmits a signal indicating the completion of the initialization to the second control circuit 24 (step S106).

Upon receiving the signal indicating the completion of the initialization, the second control circuit 24 transmits a signal indicating a reception standby instruction to the second signal processor 22 (step S108). The second signal processor 22 that has received the signal indicating the reception standby instruction enters a standby state of waiting for reception of the reception signal 52 and the analog sound signal 54 from the first electronic component 10 (step S110).

When the second signal processor 22 enters the standby state, the second control circuit 24 transmits the output start instruction signal 80 to the first control circuit 14 (step S112).

On the other hand, when the reception device 1 is activated (step S100), the receiver 12A of the first signal processor 12 starts reception processing of the radio broadcast wave 50 (step S114), and the analog sound demodulator 12B of the first signal processor 12 starts demodulation processing of the analog sound signal 54 (step S116). Therefore, when the reception device 1 is activated, output of the reception signal 52 from the receiver 12A to the first transmitter 12C is started, and output of the analog sound signal 54 from the analog sound demodulator 12B to the second transmitter 12D is started.

At a time when the output start instruction signal 80 is received from the second electronic component 20, the first control circuit 14 transmits the output start instruction signal 80 to the first transmitter 12C and the second transmitter 12D (step S118).

Note that, in step S112, the second control circuit 24 may transmit the output start instruction signal 80 for the first transmitter 12C and the output start instruction signal 80 for the second transmitter 12D to the first control circuit 14. In this case, the first control circuit 14 may simultaneously transmit the output start instruction signal 80 for the first transmitter 12C and the output start instruction signal 80 for the second transmitter 12D to the first signal processor 12.

The first transmitter 12C and the second transmitter 12D that have received the output start instruction signal 80 start transmitting the reception signal 52 and the analog sound signal 54 to the second electronic component 20, respectively (step S120 and step S122). Therefore, the transmission of the reception signal 52 from the first transmitter 12C to the second electronic component 20 and the transmission of the analog sound signal 54 from the second transmitter 12D to the second electronic component 20 are simultaneously started. As described above, the time lag between the start timings of the transmission of the transmission of the reception signal 52 from the first transmitter 12C to the second electronic component 20 and the transmission of the analog sound signal 54 from the second transmitter 12D to the second electronic component 20 may be equal to or less than the first time difference.

By the processing in steps S120 and S122, the first receiver 22A of the second signal processor 22 starts receiving the reception signal 52, and the second receiver 22B of the second signal processor 22 starts receiving the analog sound signal 54 (step S124 and step S126).

Therefore, the first receiver 22A of the second signal processor 22 and the second receiver 22B of the second signal processor 22 continuously receive the reception signal 52 and the analog sound signal 54 in a state where the fixed time difference is maintained.

The digital sound demodulator 22C demodulates the reception signal 52 received by the first receiver 22A, and outputs the digital sound signal 58 to the selector 22D (step S128). In addition, the digital sound demodulator 22C generates the switching signal 60 by using the reception signal 52, and outputs the switching signal 60 to the selector 22D.

The selector 22D adjusts the output time difference between the digital sound signal 58 and the analog sound signal 54 such that the timings of the same sound components included in the digital sound signal 58 input from the digital sound demodulator 22C and the analog sound signal 54 input from the second receiver 22B coincide with each other (step S130). The selector 22D adjusts the output time difference between the digital sound signal 58 and the switching signal 60, and the analog sound signal 54 using the fixed time difference such that the timings of the same sound components included in the digital sound signal 58 and the analog sound signal 54 coincide with each other.

Then, the selector 22D selects at least one of the digital sound signal 58 and the analog sound signal 54, for which the output time difference has been adjusted, as the output sound signal 70 (step S132). The output sound signal 70 selected in step S132 is output to an external device, an amplification device, or the like by the output unit 22E (step S134). Then, this sequence is ended.

As described above, the reception device 1 of the present embodiment includes the first electronic component 10 and the second electronic component 20.

The first electronic component 10 includes the first signal processor 12 and the first control circuit 14 that controls the first signal processor 12. The first signal processor 12 includes the receiver 12A, the analog sound demodulator 12B, the first transmitter 12C, and the second transmitter 12D. The receiver 12A receives the radio broadcast wave 50 including a digital broadcast wave and an analog broadcast wave. The analog sound demodulator 12B demodulates the radio broadcast wave 50 and outputs the reception signal 52. The first transmitter 12C transmits the reception signal 52 to the second electronic component 20. The second transmitter 12D transmits the analog sound signal 54 to the second electronic component 20.

In other words, the first processor executes the first program stored in the first memory to output the analog sound signal 54 generated by demodulating the reception signal 52 including a digital broadcast wave and an analog broadcast wave, transmit the reception signal 52 to the second electronic component 20, and transmit the analog sound signal 54 to the second electronic component 20.

The second electronic component 20 includes the second signal processor 22 and the second control circuit 24 that controls the second signal processor 22.

The second signal processor 22 includes the first receiver 22A, the second receiver 22B, the digital sound demodulator 22C, the selector 22D, and the output unit 22E. The first receiver 22A receives the reception signal 52 from the first transmitter 12C. The second receiver 22B receives the analog sound signal 54 from the second transmitter 12D. The digital sound demodulator 22C demodulates the reception signal 52 and outputs the digital sound signal 58. The selector 22D selects at least one of the digital sound signal 58 and the analog sound signal 54 as the output sound signal 70.

In other words, the second processor executes the second program stored in the second memory to receive the reception signal 52 from the first electronic component 10, receive the analog sound signal 54 from the first electronic component 10, output the digital sound signal 58 generated by demodulating the reception signal 52, and select at least one of the digital sound signal 58 and the analog sound signal 54 as the output sound signal 70.

The first control circuit 14 controls the first signal processor 12 such that the transmission of the reception signal 52 from the first transmitter 12C of the first electronic component 10 to the second electronic component 20 and the transmission of the analog sound signal 54 from the second transmitter 12D of the first electronic component 10 to the second electronic component 20 are simultaneously started.

Here, for example, from the viewpoint of cost reduction, improvement of system extensibility, or the like, it is assumed that demodulation of a digital broadcast wave and demodulation of an analog broadcast wave are executed by different electronic components. More specifically, for example, it is assumed that demodulation of an analog broadcast wave is executed by an electronic component such as a dedicated large scale integration (LSI), and demodulation of a digital broadcast wave is executed by a general-purpose electronic component that executes processing other than the processing of the radio broadcast wave 50. Additionally, for example, it is assumed that demodulation of a digital broadcast wave is executed by an electronic component that executes processing of all functions other than the processing of the radio broadcast wave 50, such as drawing of a screen and reproduction of data stored in a universal serial bus (USB).

When demodulation of a digital broadcast wave and demodulation of an analog broadcast wave are executed by different electronic components as in the cases exemplified above, it is also assumed that the output time difference between the digital sound signal and the analog sound signal is adjusted by adjusting the processing time of each of the digital broadcasting processing system and the analog broadcasting processing system so as to be kept constant and delaying the analog broadcast wave by a predetermined time.

However, when demodulation of a digital broadcast wave and demodulation of an analog broadcast wave are performed in different electronic components, it is difficult to keep the processing time constant, and it is difficult to fix the time difference of each processing system, which occurs due to the processing time difference of demodulation between the electronic components. For this reason, in the related art, it is difficult to easily adjust the output time difference between the digital sound signal 58 and the analog sound signal 54.

In contrast, according to the reception device 1 of the present embodiment, the first control circuit 14 of the first electronic component 10 controls the first signal processor 12 such that the transmission of the reception signal 52 from the first transmitter 12C to the second electronic component 20 and the transmission of the analog sound signal 54 from the second transmitter 12D to the second electronic component 20 are simultaneously started.

Under the control of the first control circuit 14, the transmission of the reception signal 52 from the first transmitter 12C to the second electronic component 20 and the transmission of the analog sound signal 54 from the second transmitter 12D to the second electronic component 20 are simultaneously started. Therefore, a reception time difference between the reception signal 52 initially received by the second electronic component 20 from the first electronic component 10 and the analog sound signal 54 initially received by the second electronic component 20 from the first electronic component 10 is fixed. That is, the difference between the timings of the same sound components included in the reception signal 52 and the analog sound signal 54 becomes the reception time difference being fixed, that is, becomes a fixed time difference. Therefore, the second electronic component 20 continuously receives the reception signal 52 and the analog sound signal 54 in a state where the fixed time difference is maintained even after the start of reception.

Therefore, in the second electronic component 20, the output time difference between the digital sound signal 58 and the analog sound signal 54 may be adjusted using the fixed time difference such that the timings of the same sound components included coincide with each other, and the output time difference can be easily adjusted.

Therefore, the reception device 1 of the present embodiment can easily adjust the output time difference between the digital sound signal 58 and the analog sound signal 54 in the reception device 1 that demodulates a digital broadcast wave and demodulates an analog broadcast wave using different electronic components.

Second Embodiment

In the present embodiment, a mode in which a synthesis parameter calculated on the first electronic component side is further transmitted to the second electronic component will be described. Note that in the present embodiment, the same functions and the same components as those of the first embodiment are denoted by the same reference numerals, and a detailed description thereof may be omitted.

Figure 3:
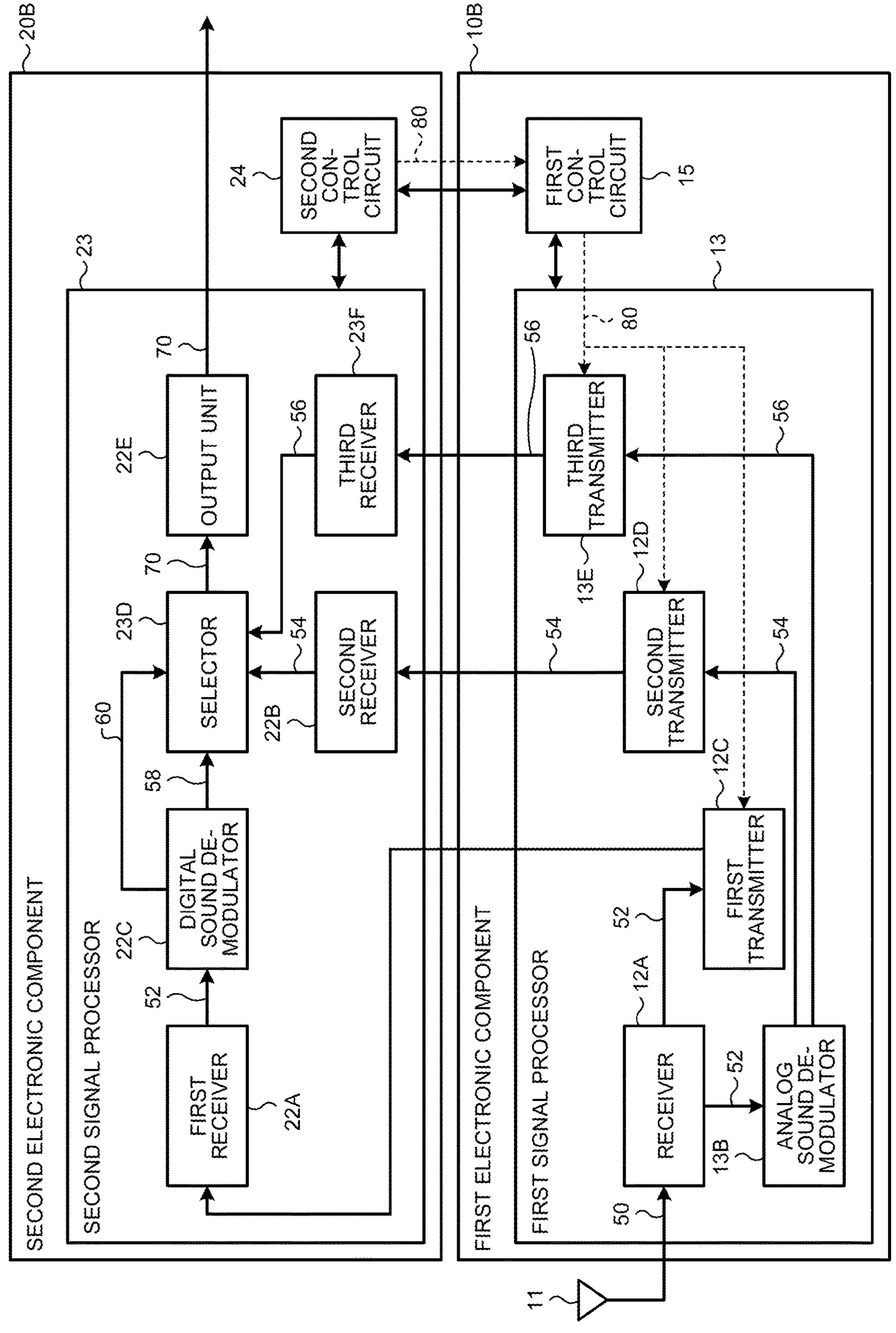
FIG. 3 is a diagram illustrating a configuration of a reception device according to a second embodiment.

FIG. 3 is a diagram illustrating an example of a configuration of a reception device 1B according to the present embodiment.

The reception device 1B includes a first electronic component 10B and a second electronic component 20B. The first electronic component 10B and the second electronic component 20B are connected so as to be able to exchange data or signals.

The first electronic component 10B is an electronic component that demodulates an analog broadcast wave. The first electronic component 10B includes a first signal processor 13 and a first control circuit 15. The first electronic component 10B includes the first signal processor 13 instead of the first signal processor 12 of the above embodiment, and includes the first control circuit 15 instead of the first control circuit 14. The first signal processor 13 and the first control circuit 15 are connected so as to be able to exchange data or signals. The first control circuit 15 controls the first signal processor 13. The first signal processor 13 executes various kinds of processing related to demodulation of the analog broadcast wave. The first control circuit 15 controls the first signal processor 13.

The first signal processor 13 includes the antenna 11, the receiver 12A, an analog sound demodulator 13B, the first transmitter 12C, the second transmitter 12D, and a third transmitter 13E. The receiver 12A, the first transmitter 12C, and the second transmitter 12D are similar to those in the above embodiment.

The analog sound demodulator 13B demodulates the reception signal 52 and outputs the analog sound signal 54 to the second transmitter 12D similarly to the analog sound demodulator 12B of the above embodiment. In the present embodiment, the analog sound demodulator 13B further calculates a synthesis parameter 56.

The synthesis parameter 56 is a parameter related to synthesis between the digital sound signal 58 and the analog sound signal 54. Specifically, the synthesis parameter 56 is information indicating a degree of deterioration to which the digital sound signal 58 is deteriorated when the analog sound signal 54 and the digital sound signal 58 are synthesized on the second electronic component 20B side described later. In other words, the synthesis parameter 56 is information for modifying at least one of the analog sound signal 54 and the digital sound signal 58 on the second electronic component 20B side in order to reduce the uncomfortable feeling of the output sound when the output sound signal 70 output from the second electronic component 20B described later is switched between the analog sound signal 54 and the digital sound signal 58.

The synthesis parameter 56 is, for example, S/N, C/N, or a multipath detection value of a signal of the analog broadcast wave included in the reception signal 52. In addition, the synthesis parameter 56 may be a numerical value used for modifying at least one of the analog sound signal 54 and the digital sound signal 58 on the second electronic component 20B side. The numerical value is, for example, a numerical value for changing a signal level, a separation ratio of a stereo signal, a filter coefficient for changing frequency characteristics, and the like.

Specifically, the analog sound demodulator 13B compares the signal level of the analog sound signal 54 with the noise level, and calculates the S/N. For example, the analog sound demodulator 13B calculates the C/N on the basis of the signal spectrum of a signal of the analog broadcast wave included in the reception signal 52. Moreover, for example, the analog sound demodulator 13B calculates the C/N on the basis of a signal component of the frequency of a signal of the analog broadcast wave included in the reception signal 52 and the amount of noise included in the frequencies on both sides of the signal component. Note that, in the case of an analog broadcast wave, there is a correlation between the C/N and the S/N. Therefore, the S/N can be estimated on the basis of the C/N. In addition, when a multipath is included in the analog broadcast wave, the noise of the high-frequency component of the baseband signal of FM modulation increases. Therefore, the analog sound demodulator 13B calculates, for example, the amount of noise of the high-frequency component of the reception signal 52 that is the baseband signal of the FM modulation as a multipath detection value.

The analog sound demodulator 13B outputs the calculated synthesis parameter 56 to the third transmitter 13E.

The third transmitter 13E transmits the synthesis parameter 56 input from the analog sound demodulator 13B to the second electronic component 20.

The third transmitter 13E is an interface that transmits data. The third transmitter 13E transmits the synthesis parameter 56 to the second electronic component 20B according to, for example, the I2S scheme. Note that the communication scheme of the third transmitter 13E is not limited to I2S.

The first control circuit 15 controls the first signal processor 13 such that transmission of the reception signal 52 from the first transmitter 12C to the second electronic component 20B, transmission of the analog sound signal 54 from the second transmitter 12D to the second electronic component 20B, and transmission of the synthesis parameter 56 from the third transmitter 13E to the second electronic component 20B are simultaneously started.

When, for example, power supply to each unit of the reception device 1B is started by an operation instruction by the user and then the reception device 1B is activated, the first control circuit 15 transmits the output start instruction signal 80 to the first transmitter 12C, the second transmitter 12D, and the third transmitter 13E.

Similarly to the above embodiment, the first control circuit 15 transmits the output start instruction signal 80 to the first transmitter 12C, the second transmitter 12D, and the third transmitter 13E when power supply to each unit of the reception device 1B is started, the reception device 1B is activated, and the output start instruction signal 80 is received from the second electronic component 20B.

Upon receiving the output start instruction signal 80 from the first control circuit 15, the first transmitter 12C, the second transmitter 12D, and the third transmitter 13E start transmitting the reception signal 52, the analog sound signal 54, and the synthesis parameter 56 to the second electronic component 20B, respectively. Therefore, the transmission of the reception signal 52 from the first transmitter 12C to the second electronic component 20B, the transmission of the analog sound signal 54 from the second transmitter 12D to the second electronic component 20B, and the transmission of the synthesis parameter 56 from the third transmitter 13E to the second electronic component 20B are simultaneously started.

Similarly to the above embodiment, the transmission of the reception signal 52 from the first transmitter 12C to the second electronic component 20B and the transmission of the analog sound signal 54 from the second transmitter 12D to the second electronic component 20B may be started simultaneously, that is, with a time difference within the first time difference. The time lag between the start timings of the transmission of the reception signal 52 or the analog sound signal 54 and the synthesis parameter 56 to the second electronic component 20B may be a time difference within the first time difference and larger than the time lag between the start timings of the transmission of the reception signal 52 and the analog sound signal 54.

Next, the second electronic component 20B will be described.

The second electronic component 20B includes a second signal processor 23 and the second control circuit 24. The second signal processor 23 and the second control circuit 24 are connected so as to be able to exchange data or signals. The second control circuit 24 executes processing similar to that in the above embodiment. In the present embodiment, the second control circuit 24 is communicably connected to the first control circuit 15 of the first electronic component 10B. In addition, in the present embodiment, the second control circuit 24 controls the second signal processor 23 instead of the second signal processor 22. The second signal processor 23 performs various kinds of processing related to demodulation of the digital sound signal 58 and output of the output sound signal 70.

The second signal processor 23 includes the first receiver 22A, the second receiver 22B, the digital sound demodulator 22C, a selector 23D, the output unit 22E, and a third receiver 23F. The first receiver 22A, the second receiver 22B, the digital sound demodulator 22C, and the output unit 22E are similar to those in the above embodiment.

The third receiver 23F receives the synthesis parameter 56 from the third transmitter 13E.

The third receiver 23F is a communication interface that communicates with the third transmitter 13E of the first electronic component 10B. In other words, the third receiver 23F of the second electronic component 20B and the third transmitter 13E of the first electronic component 10B form one communication path for transmitting and receiving data in a one-to-one relationship. Therefore, the third receiver 23F operates in accordance with the same standard as the third transmitter 13E, and receives the synthesis parameter 56 from the third transmitter 13E.

The third receiver 23F outputs the synthesis parameter 56 received from the third transmitter 13E to the selector 23D.

The selector 23D selects at least one of the digital sound signal 58 and the analog sound signal 54 as the output sound signal 70 similarly to the selector 22D of the above embodiment. In the present embodiment, when selecting the digital sound signal 58 and the analog sound signal 54 as the output sound signal 70, the selector 23D selects, as the output sound signal 70, a signal obtained by synthesizing the digital sound signal 58 and the analog sound signal 54 at a synthesis ratio in accordance with the synthesis parameter 56. Then, the selector 23D outputs the selected output sound signal 70 to the output unit 22E.

Specifically, the digital sound signal 58 and the switching signal 60 are input from the digital sound demodulator 22C to the selector 23D. Moreover, the analog sound signal 54 is input from the second receiver 22B to the selector 23D. Moreover, the synthesis parameter 56 is input from the third receiver 23F to the selector 23D.

The selector 23D adjusts the output time differences among the digital sound signal 58 and the switching signal 60, the analog sound signal 54, and the synthesis parameter 56 using the fixed time difference such that the timings of the same sound components included in the digital sound signal 58 input from the digital sound demodulator 22C and the analog sound signal 54 input from the second receiver 22B coincide with each other, similarly to the selector 22D of the above embodiment.

Then, the selector 23D performs switching processing using the digital sound signal 58, the switching signal 60, and the analog sound signal 54, for which the output time difference has been adjusted, similarly to the selector 22D of the above embodiment. By the switching processing, the second signal processor 23 selects at least one of the digital sound signal 58 and the analog sound signal 54 as the output sound signal 70, and outputs the selected output sound signal 70 to the output unit 22E.

In addition, when selecting the digital sound signal 58 and the analog sound signal 54, for which the output time difference has been adjusted, as the output sound signal 70, the selector 23D modifies at least one of the analog sound signal 54 and the digital sound signal 58 in accordance with the synthesis parameter 56, for which the output time difference has been adjusted. Then, the selector 23D outputs the output sound signal 70, which is a modified signal, to the output unit 22E. The output unit 22E is similar to that of the above embodiment.

The selector 23D may spend a predetermined switching time to switch from the digital sound signal 58 to the analog sound signal 54 and from the analog sound signal 54 to the digital sound signal 58. The selector 23D may modify at least one of the analog sound signal 54 and the digital sound signal 58 using the synthesis parameter 56 during the switching time.

Next, an example of a flow of processing executed by the reception device 1B will be described.

Figure 4:
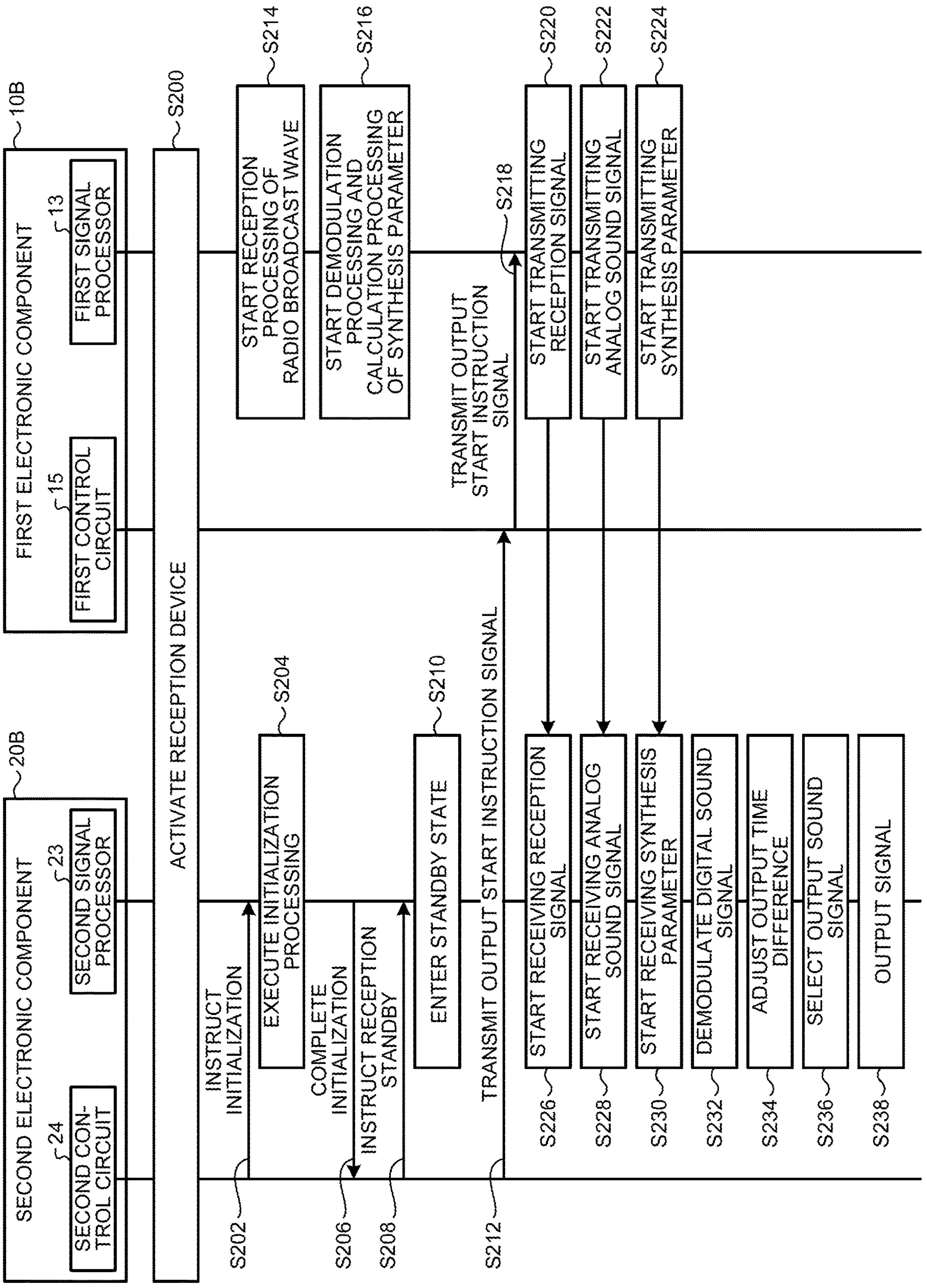
FIG. 4 is a sequence diagram illustrating a flow of processing executed by the reception device according to the second embodiment.

FIG. 4 is a sequence diagram illustrating a flow of processing executed by the reception device 1B.

In the reception device 1B, the processing of steps S200 to $218 is performed similarly to steps S100 to S118 of the above embodiment.

Specifically, when power supply to each unit of the reception device 1B is started, the reception device 1B is activated (step S200). The second control circuit 24 of the second electronic component 20B transmits a signal indicating an initialization instruction to the second signal processor 23 (step S202). The second signal processor 23 that has received the signal indicating the initialization instruction executes initialization processing (step S204). When the initialization processing is completed, the second signal processor 23 transmits a signal indicating the completion of the initialization to the second control circuit 24 (step S206).

Upon receiving the signal indicating the completion of the initialization, the second control circuit 24 transmits a signal indicating a reception standby instruction to the second signal processor 23 (step S208). The second signal processor 23 that has received the signal indicating the reception standby instruction enters a standby state of waiting for reception of the reception signal 52, the analog sound signal 54, and the synthesis parameter 56 from the first electronic component 10B (step S210).

When the second signal processor 23 enters the standby state, the second control circuit 24 transmits the output start instruction signal 80 to the first control circuit 15 (step S212).

On the other hand, when the reception device 1B is activated (step S200), the receiver 12A of the first signal processor 13 starts reception processing of the radio broadcast wave 50 (step S214), and the analog sound demodulator 13B of the first signal processor 13 starts demodulation processing of the analog sound signal 54 and calculation processing of the synthesis parameter 56 (step S216). Therefore, when the reception device 1B is activated, output of the reception signal 52 from the receiver 12A to the first transmitter 12C is started, output of the analog sound signal 54 from the analog sound demodulator 13B to the second transmitter 12D is started, and output of the synthesis parameter 56 from the analog sound demodulator 13B to the third transmitter 13E is started.

Upon receiving the output start instruction signal 80 from the second control circuit 24 of the second electronic component 20B, the first control circuit 15 transmits the output start instruction signal 80 to the first transmitter 12C, the second transmitter 12D and the third transmitter 13E (step S218).

The first transmitter 12C, the second transmitter 12D, and the third transmitter 13E that have received the output start instruction signal 80 start transmitting the reception signal 52, the analog sound signal 54, and the synthesis parameter 56, respectively, to the second electronic component 20B (step S220, step S222, and step S224). Therefore, the transmission of the reception signal 52 from the first transmitter 12C to the second electronic component 20B, the transmission of the analog sound signal 54 from the second transmitter 12D to the second electronic component 20B, and the transmission of the synthesis parameter 56 from the third transmitter 13E to the second electronic component 20B are simultaneously started. As described above, the time difference between the start timings of the transmission of the transmission of the reception signal 52 from the first transmitter 12C to the second electronic component 20B, the transmission of the analog sound signal 54 from the second transmitter 12D to the second electronic component 20B, and the transmission of the synthesis parameter 56 from the third transmitter 13E to the second electronic component 20B may be equal to or less than the first time difference.

By the processing of steps S220, S222, and S224, the first receiver 22A of the second signal processor 23 starts receiving the reception signal 52, the second receiver 22B of the second signal processor 23 starts receiving the analog sound signal 54, and the third receiver 23F of the second signal processor 23 starts receiving the synthesis parameter 56 (step S226, step S228, and step S230).

Therefore, the first receiver 22A of the second signal processor 23, the second receiver 22B of the second signal processor 23, and the third receiver 23F of the second signal processor 23 continuously receive the reception signal 52, the analog sound signal 54, and the synthesis parameter 56 in a state where the fixed time difference is maintained.

The digital sound demodulator 22C demodulates the reception signal 52 received by the first receiver 22A, and outputs the digital sound signal 58 to the selector 23D (step S232). In addition, the digital sound demodulator 22C generates the switching signal 60 by using the reception signal 52, and outputs the switching signal 60 to the selector 23D.

The selector 23D adjusts the output time difference between the digital sound signal 58 and the switching signal 60, the analog sound signal 54, and the synthesis parameter 56 by using the fixed time difference such that the timings of the same sound components included in the digital sound signal 58 and the analog sound signal 54 coincide with each other (step S234).

Then, the selector 23D selects at least one of the digital sound signal 58 and the analog sound signal 54, for which the output time difference has been adjusted, as the output sound signal 70 in accordance with the switching signal 60 and the synthesis parameter 56, for which the output time difference has been adjusted (step S236). The output sound signal 70 selected in step S236 is output to an external device, an amplification device, or the like by the output unit 22E (step S238). Then, this sequence is ended.

As described above, in the reception device 1B of the present embodiment, the first control circuit 15 of the first electronic component 10B controls the first signal processor 13 such that the transmission of the reception signal 52 from the first transmitter 12C to the second electronic component 20B, the transmission of the analog sound signal 54 from the second transmitter 12D to the second electronic component 20B, and the transmission of the synthesis parameter 56 from the third transmitter 13E to the second electronic component 20B are simultaneously started.

That is, under the control of the first control circuit 15, the transmission of the reception signal 52 from the first transmitter 12C to the second electronic component 20B, the transmission of the analog sound signal 54 from the second transmitter 12D to the second electronic component 20B, and the transmission of the synthesis parameter 56 from the third transmitter 13E to the second electronic component 20B are simultaneously started. Therefore, a reception time difference between the reception signal 52 initially received by the second electronic component 20B from the first electronic component 10B, the analog sound signal 54 initially received by the second electronic component 20B from the first electronic component 10B, and the synthesis parameter 56 initially received by the second electronic component 20B from the first electronic component 10B is fixed. That is, the second electronic component 20B continuously receives the reception signal 52, the analog sound signal 54, and the synthesis parameter 56 in a state where the fixed time difference, which is the fixed reception time difference, is maintained even after the start of reception.

Therefore, in the second electronic component 20B, the output time difference between the digital sound signal 58, the analog sound signal 54, and the synthesis parameter 56 may be adjusted using the fixed time difference such that the timings of the same sound components included coincide with each other, and the output time difference can be easily adjusted. That is, the second electronic component 20B can easily adjust the output time difference for the synthesis parameter 56 in addition to the effects of the first embodiment.

Therefore, in addition to the effects of the above embodiment, the reception device 1B of the present embodiment can adjust the output time difference among the digital sound signal 58, the analog sound signal 54, and the synthesis parameter 56.

Note that, in the present embodiment, a mode in which the third receiver 23F of the second electronic component 20B and the third transmitter 13E of the first electronic component 10B form one communication path for transmitting and receiving data in a one-to-one relationship has been described as an example. In addition, in the present embodiment, a mode in which the second receiver 22B of the second electronic component 20B and the second transmitter 12D of the first electronic component 10B form one communication path for transmitting and receiving data in a one-to-one relationship has been described as an example. However, the second receiver 22B and the third receiver 23F may be connected to the second transmitter 12D and the third transmitter 13E via one communication path. In this case, the communication path may be a 32 bit line, 16 bits may be used as a communication path between the third receiver 23F and the third transmitter 13E, and the remaining 16 bits may be used as a communication path between the second receiver 22B and the second transmitter 12D.

The synthesis parameter 56 may be transmitted to the second electronic component 20B together with the reception signal 52 or the analog sound signal 54 by time division multiplexing (TDM).

Third Embodiment

In the present embodiment, a mode in which a first control circuit transmits the synthesis parameter 56 calculated on the first electronic component side to the second electronic component will be described. Note that in the present embodiment, the same functions and the same components as those of the above embodiment are denoted by the same reference numerals, and a detailed description thereof may be omitted.

Figure 5:
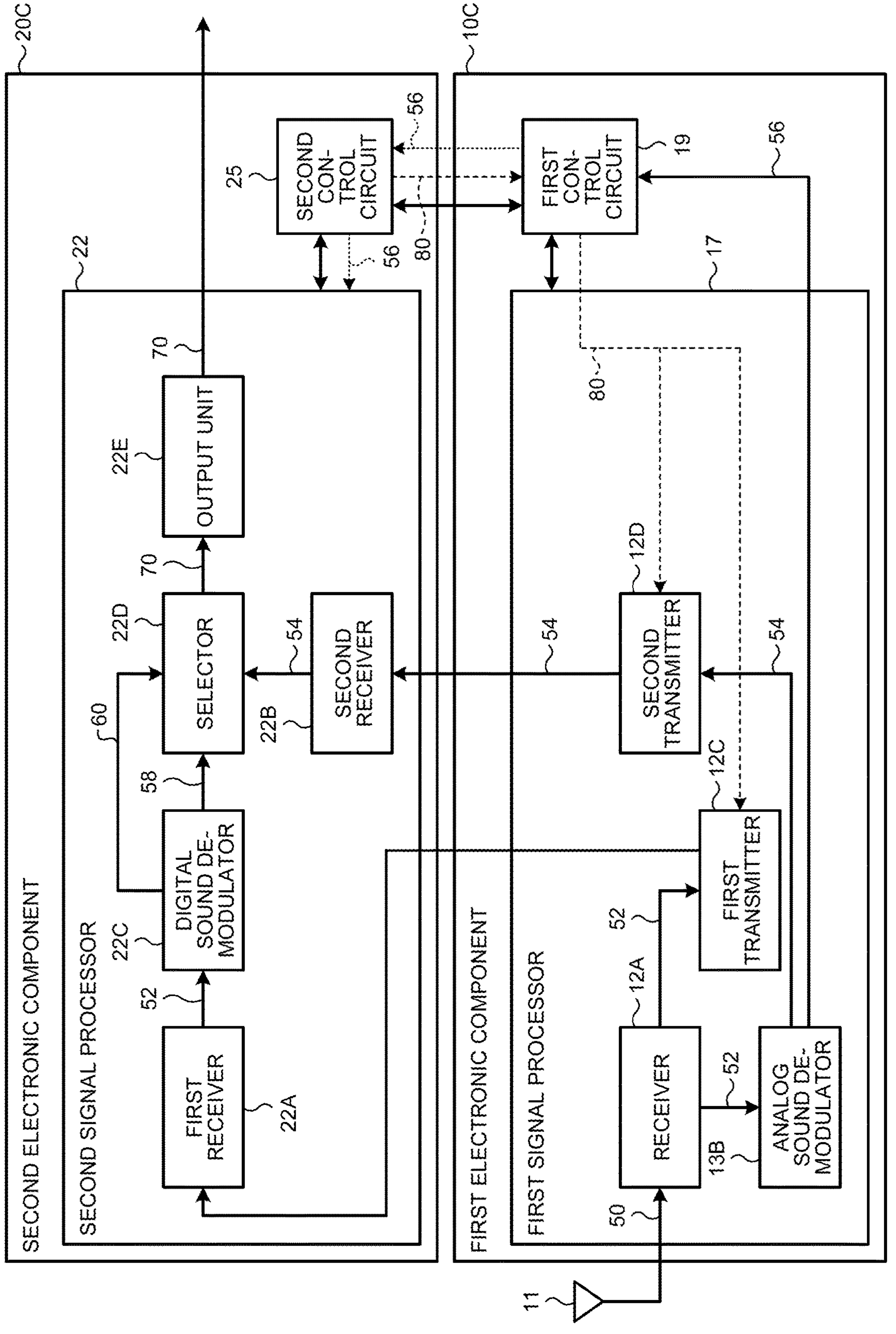
FIG. 5 is a diagram illustrating a configuration of a reception device according to a third embodiment.

FIG. 5 is a diagram illustrating a configuration of a reception device 1C according to the present embodiment.

The reception device 1C includes a first electronic component 10C and a second electronic component 20C. The first electronic component 10C and the second electronic component 20C are connected so as to be able to exchange data or signals.

The first electronic component 10C is an electronic component that demodulates an analog broadcast wave. The first electronic component 10C includes a first signal processor 17 and a first control circuit 19. That is, the first electronic component 10C includes the first signal processor 17 instead of the first signal processor 12 of the first embodiment, and includes the first control circuit 19 instead of the first control circuit 14. The first signal processor 17, the first control circuit 19, and the first memory are connected so as to be able to exchange data or signals.

Similarly to the first signal processor 12, the first signal processor 17 executes various kinds of processing related to demodulation of the analog broadcast wave. The first control circuit 19 controls the first signal processor 17.

The first signal processor 17 includes the antenna 11, the receiver 12A, the analog sound demodulator 13B, the first transmitter 12C, and the second transmitter 12D. The receiver 12A, the first transmitter 12C, and the second transmitter 12D are similar to those in the first embodiment. The analog sound demodulator 13B is similar to that of the second embodiment.

In the present embodiment, the analog sound demodulator 13B demodulates the reception signal 52, and outputs the analog sound signal 54 to the second transmitter 12D, similarly to the analog sound demodulator 12B of the first embodiment. In addition, the analog sound demodulator 13B calculates the synthesis parameter 56, similarly to the analog sound demodulator 13B of the second embodiment. In the present embodiment, the first control circuit 19 acquires the synthesis parameter 56 calculated by the analog sound demodulator 13B. For example, the first control circuit 19 acquires the synthesis parameter 56 from the analog sound demodulator 13B every predetermined time.

Similarly to the first control circuit 14 of the first embodiment, the first control circuit 19 controls the first signal processor 17 such that transmission of the reception signal 52 from the first transmitter 12C to the second electronic component 20C and transmission of the analog sound signal 54 from the second transmitter 12D to the second electronic component 20C are simultaneously started. That is, when receiving the output start instruction signal 80 from a second control circuit 25, the first control circuit 19 transmits the output start instruction signal 80 to the first transmitter 12C and the second transmitter 12D. By the above processing, the transmission of the reception signal 52 from the first transmitter 12C to the second electronic component 20C and the transmission of the analog sound signal 54 from the second transmitter 12D to the second electronic component 20C are simultaneously started.

In the present embodiment, the first control circuit 19 further transmits the synthesis parameter 56 calculated by the analog sound demodulator 13B to the second signal processor 22 via the second control circuit 25 of the second electronic component 20C.

For example, the first control circuit 19 acquires the synthesis parameter 56 calculated by the analog sound demodulator 13B every predetermined time, and transmits the synthesis parameter 56 to the second control circuit 25 of the second electronic component 20C. For example, when the value of the synthesis parameter 56 calculated by the analog sound demodulator 13B is different from the previously acquired value, the first control circuit 19 may transmit the synthesis parameter 56 to the second control circuit 25 of the second electronic component 20C.

Next, the second electronic component 20C will be described.

Similarly to the second electronic component 20 of the first embodiment, the second electronic component 20C is an electronic component that demodulates a digital broadcast wave. The second electronic component 20C includes the second signal processor 22 and the second control circuit 25. The second signal processor 22 and the second control circuit 25 are connected so as to be able to exchange data or signals. The second signal processor 22 is similar to that of the first embodiment.

The second control circuit 25 controls the second signal processor 22. The second control circuit 25 further executes the following processing in addition to the processing of the second control circuit 24 of the first embodiment. Upon receiving the synthesis parameter 56 from the first control circuit 19, the second control circuit 25 transmits the received synthesis parameter 56 to the selector 22D of the second signal processor 22. Therefore, the first control circuit 19 of the first electronic component 10C transmits the synthesis parameter 56 calculated by the analog sound demodulator 13B to the second signal processor 22 via the second control circuit 25.

The selector 22D of the second signal processor 22 of the present embodiment adjusts the output time difference between the digital sound signal 58 and the switching signal 60, and the analog sound signal 54 such that the timings of the same sound components included in the analog sound signal 54 and the digital sound signal 58 coincide with each other. The selector 22D adjusts the output time difference using the above fixed time difference similarly to the first embodiment. In a case of selecting the digital sound signal 58 and the analog sound signal 54 as the output sound signal 70 in accordance with the switching signal 60, the selector 22D may perform the same processing as the selector 23D of the second embodiment. Specifically, the selector 22D of the present embodiment modifies the digital sound signal 58 and the analog sound signal 54 in accordance with the synthesis parameter 56 received from the second control circuit 25, and the selector 22D selects the modified signal as the output sound signal 70. Then, the selector 22D outputs the selected output sound signal 70 to the output unit 22E.

Next, an example of a flow of processing executed by the reception device 1C will be described.

The flow of processing by the reception device 1C is similar to the flow of processing by the reception device 1 of the first embodiment except for the following points (see FIG. 2). That is, in the reception device 1C, the selector 22D of the second electronic component 20C receives the synthesis parameter 56 calculated by the analog sound demodulator 13B from the second control circuit 25 via the first control circuit 19. Then, the selector 22D of the second electronic component 20C selects at least one of the digital sound signal 58 and the analog sound signal 54 as the output sound signal 70 in the processing in step S132 (see FIG. 2). In addition, when selecting the digital sound signal 58 and the analog sound signal 54 as the output sound signal 70 in accordance with the switching signal 60, the selector 22D selects, as the output sound signal 70, a signal obtained by modifying the digital sound signal 58 and the analog sound signal 54 in accordance with to the synthesis parameter 56 received from the second control circuit 25.

As described above, in the reception device 1C of the present embodiment, the first control circuit 19 transmits the synthesis parameter 56 calculated by the analog sound demodulator 13B to the second signal processor 22 via the second control circuit 25. In addition, in the reception device 1C of the present embodiment, similarly to the above embodiment, the second electronic component 20C adjusts the output time difference between the digital sound signal 58 and the analog sound signal 54 using the fixed time difference such that the timings of the same sound components included in the digital sound signal 58 and the analog sound signal 54 coincide with each other.

Therefore, the reception device 1C of the present embodiment can easily adjust the output time difference between the digital sound signal 58 and the analog sound signal 54, similarly to the above embodiment. In addition, in the reception device 1C of the present embodiment, the synthesis parameter 56 calculated by the analog sound demodulator 13B is received by the second signal processor 22 via the first control circuit 19 and the second control circuit 25, and is used for modifying the digital sound signal 58 and the analog sound signal 54. Therefore, in the reception device 1C of the present embodiment, in addition to the effects of the first embodiment, the output time difference can be easily adjusted for the synthesis parameter 56.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

According to the present disclosure, in the reception device that performs demodulation of a digital broadcast wave and demodulation of an analog broadcast wave using different electronic components, it is possible to easily adjust an output time difference between a digital sound signal and an analog sound signal.

What is claimed is:

1. A reception device comprising:
a first electronic component including
  a first memory in which a first computer program is stored,
  a first processor coupled to the first memory, and
  a first control circuit controlling the first processor; and
a second electronic component including
  a second memory in which a second computer program is stored,
  a second processor coupled to the second memory, and
  a second control circuit controlling the second processor, wherein
the first processor is configured to perform processing by executing the first computer program, the processing including:
  outputting an analog sound signal generated by demodulating a reception signal, the reception signal including a digital broadcast wave and an analog broadcast wave;
  transmitting the reception signal to the second electronic component; and
  transmitting the analog sound signal to the second electronic component,
the second processor is configured to perform processing by executing the second computer program, the processing including:
  receiving the reception signal from the first electronic component;
  receiving the analog sound signal from the first electronic component;
  outputting a digital sound signal generated by demodulating the reception signal; and
  selecting, as an output sound signal, at least one of the digital sound signal and the analog sound signal, and
the first control circuit is configured to control the first processor to simultaneously start a transmission of the reception signal from the first electronic component to the second electronic component and a transmission of the analog sound signal from the first electronic component to the second electronic component.

2. The reception device according to claim 1, wherein the first control circuit is configured to control the first processor to start the transmission of the reception signal from the first electronic component to the second electronic component and the transmission of the analog sound signal from the first electronic component to the second electronic component such that a time lag between a start timing of the transmission of the reception signal and a start timing of the transmission of the analog sound signal is equal to or less than a first time difference.

3. The reception device according to claim 1, wherein the second processor is configured to:

adjust an output time difference between the analog sound signal and the digital sound signal in accordance with a fixed time difference such that timings of same sound components included in the analog sound signal and the digital sound signal coincide with each other; and select, as the output sound signal, at least one of the digital sound signal and the analog sound signal for which the output time difference has been adjusted.

4. The reception device according to claim 3, wherein the second processor is configured to adjust the output time difference between the analog sound signal and the digital sound signal in accordance with the fixed time difference, the fixed time difference being a reception time difference between the analog sound signal and the reception signal each being initially received from the first electronic component.

5. The reception device according to claim 4, wherein the reception signal includes the digital broadcast wave and the analog broadcast wave, the analog broadcast wave being received with a predetermined first delay time after receiving the digital broadcast wave, and the second processor is configured to adjust the output time difference between the analog sound signal and the digital sound signal in accordance with the reception time difference and the fixed time difference that is the predetermined first delay time.

6. The reception device according to claim 3, wherein the second processor is configured to adjust the output time difference by executing adjustment processing of delaying one of the digital sound signal and the analog sound signal to offset the fixed time difference.

7. The reception device according to claim 3, wherein the second processor is configured to:

generate, by using the reception signal, a switching signal for switching between a state where the digital sound signal is selected as the output sound signal to be output and a state where the analog sound signal is selected as the output sound signal to be output; and select at least one of the digital sound signal and the analog sound signal as the output sound signal by using the switching signal.

8. The reception device according to claim 7, wherein the second processor is configured to:

generate the switching signal for switching from the state where the analog sound signal is selected to the state where the digital sound signal is selected, the switching signal being generated when demodulation of the reception signal is successful in generating the digital sound signal; and generate the switching signal for switching from the state where the digital sound signal is selected to the state where the analog sound signal is selected when demodulation of the reception signal is unsuccessful.

9. The reception device according to claim 7, wherein the second processor is configured to adjust the output time difference between: the analog sound signal, and the digital sound signal and the switching signal, in accordance with the fixed time difference such that timings of same sound components included in the analog sound signal and the digital sound signal coincide with each other.

10. The reception device according to claim 7, wherein the second processor is configured to perform, by using the switching signal, a first switch from the state where the analog sound signal is selected to the state where the digital sound signal is selected and a second switch from the state where the digital sound signal is selected to the state where the analog sound signal is selected, each of the first switch and the second switch being performed by spending a predetermined switching time.

11. The reception device according to claim 1, wherein the first processor is configured to calculate, based on the reception signal, a synthesis parameter related to synthesis between the digital sound signal and the analog sound signal, and transmit the synthesis parameter to the second electronic component, the second processor is configured to receive the synthesis parameter, and select, as the output sound signal, a signal obtained by modifying the digital sound signal and the analog sound signal in accordance with the synthesis parameter, and the first control circuit is configured to control the first processor to simultaneously start the transmission of the reception signal from the first electronic component to the second electronic component, the transmission of the analog sound signal from the first electronic component to the second electronic component, and the transmission of the synthesis parameter from the first electronic component to the second electronic component.

12. The reception device according to claim 1, wherein the first processor is configured to calculate, based on the reception signal, a synthesis parameter related to synthesis between the digital sound signal and the analog sound signal, the second processor is configured to select, as the output sound signal, a signal obtained by modifying the digital sound signal and the analog sound signal in accordance with the synthesis parameter, and the first control circuit is configured to control the first processor to simultaneously start the transmission of the reception signal from the first electronic component to the second electronic component and the transmission of the analog sound signal from the first electronic component to the second electronic component, and transmit the synthesis parameter to the second processor via the second control circuit.

* * * * *